April 9, 1957

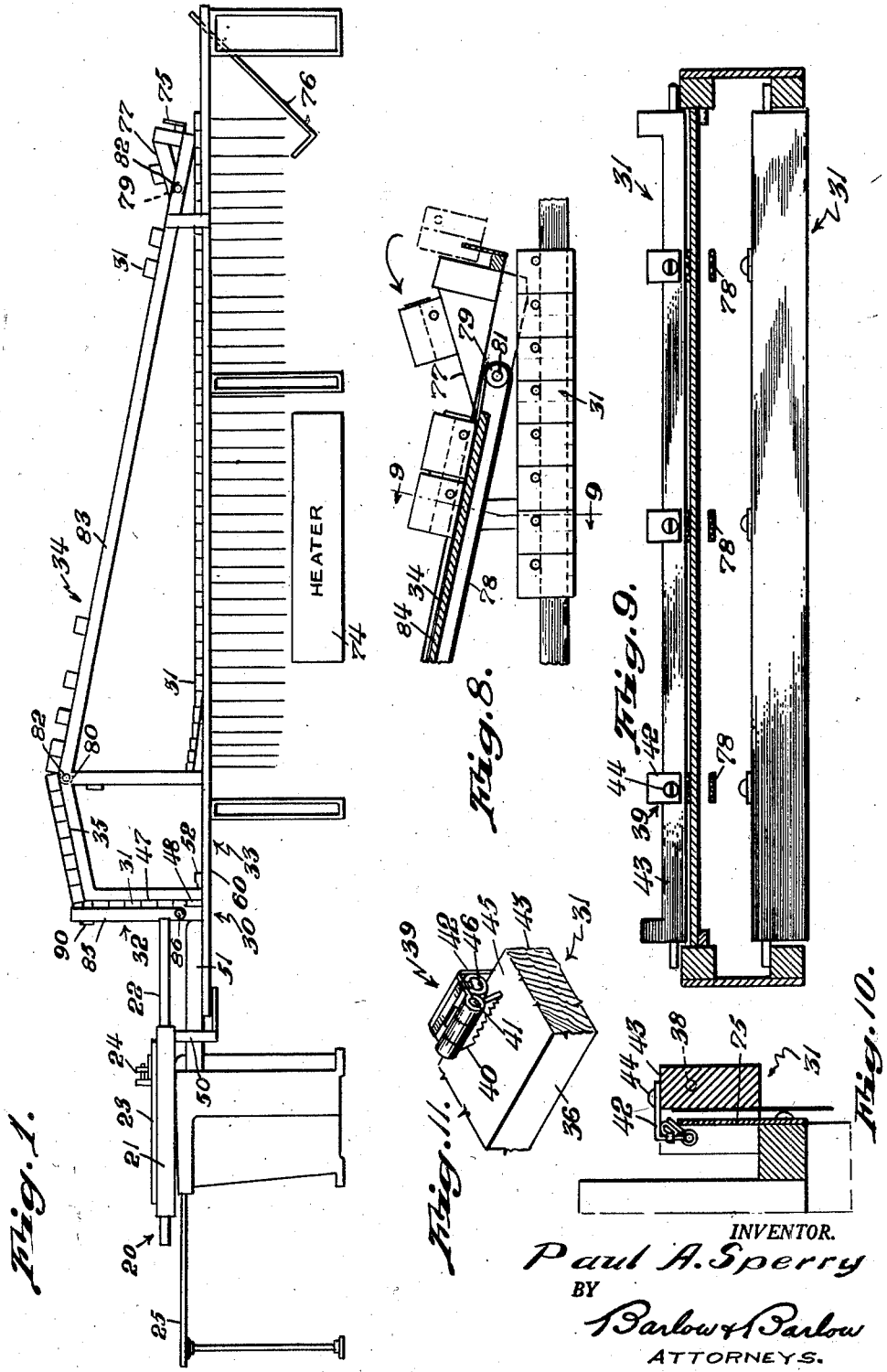

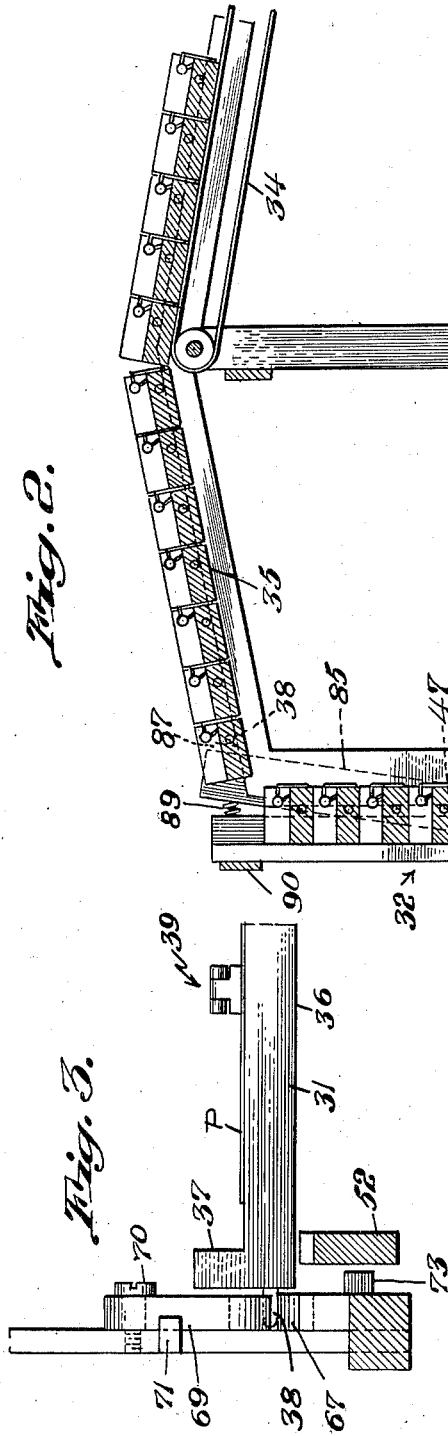
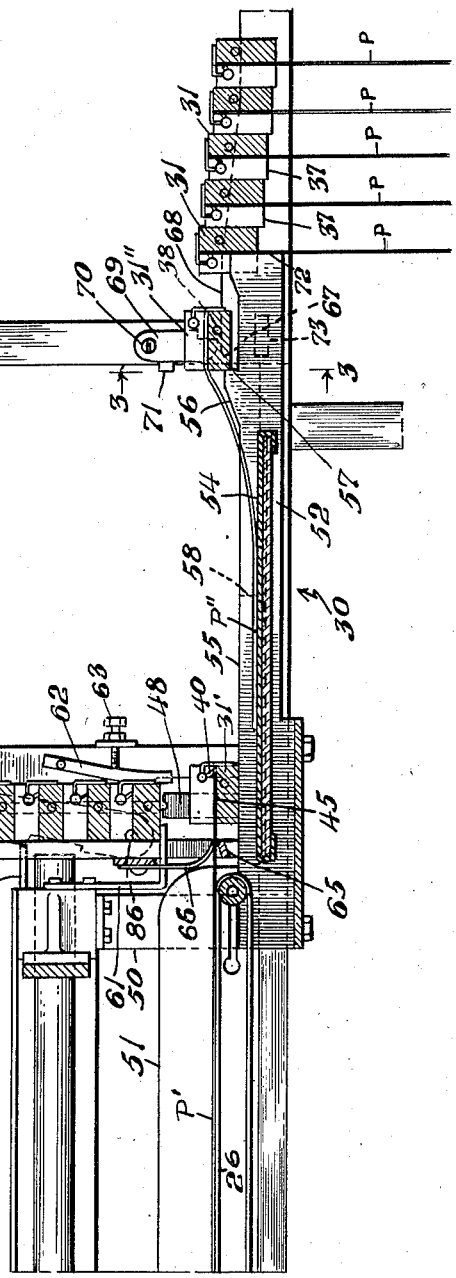

P. A. SPERRY 2,788,210

WORK HANDLING APPARATUS

Filed Aug. 4, 1953

INVENTOR.
Paul A. Sperry
BY
Barlow & Barlow
ATTORNEYS.

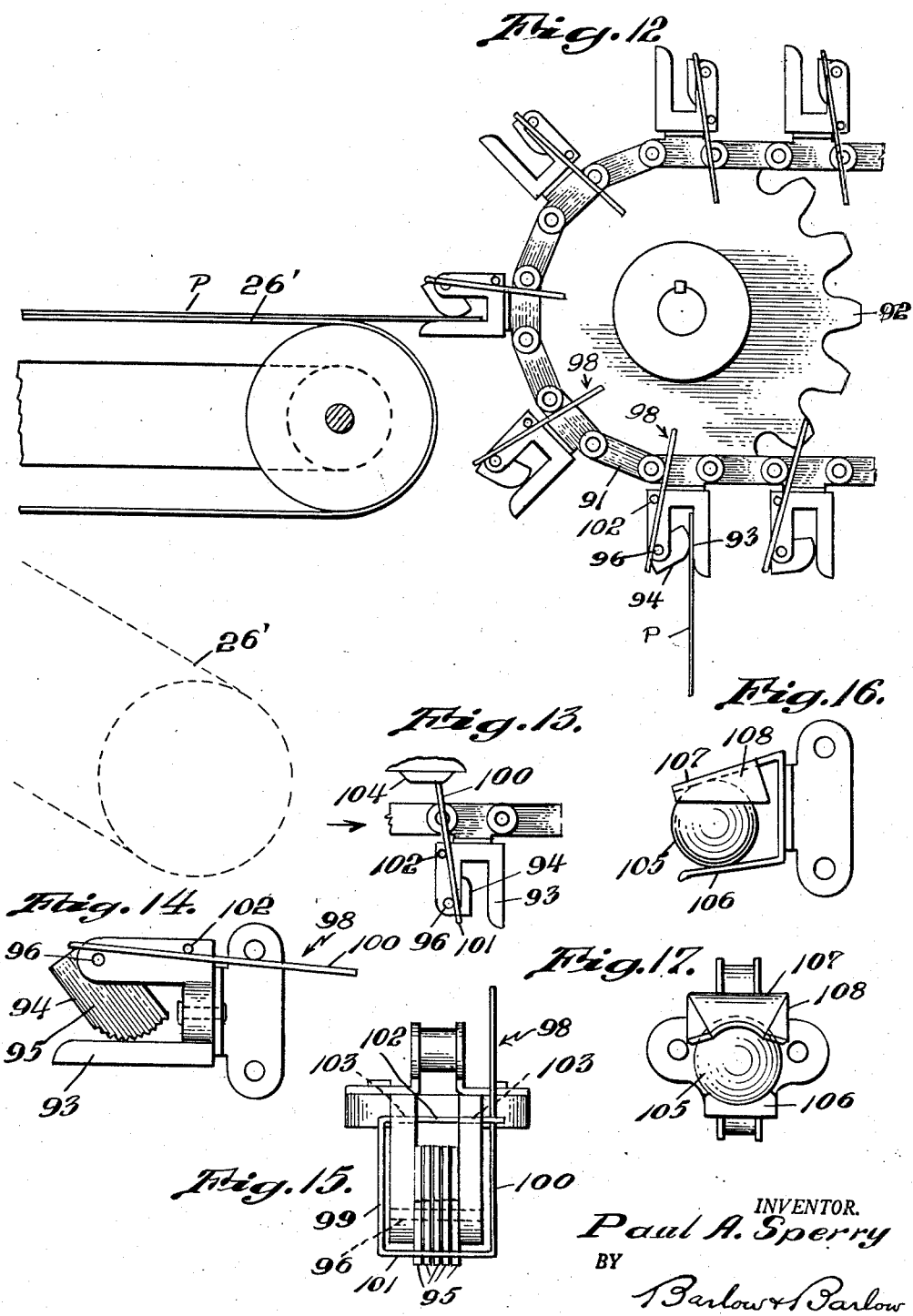

United States Patent Office 2,788,210
Patented Apr. 9, 1957

2,788,210

WORK HANDLING APPARATUS

Paul Alling Sperry, New Haven, Conn.

Application August 4, 1953, Serial No. 372,367

5 Claims. (Cl. 271—69)

This invention relates to work handling apparatus, particularly an apparatus for handling wet prints as delivered from a printing machine.

In certain type printing, as for example screen printing, individual sheets are printed and discharged from the printing area of the machine with the ink in a wet condition. Heretofore, the usual practice was to deliver the wet sheets or prints end to end on a traveling endless belt conveyor of a length to permit the prints to dry while moving from one end of the conveyor to the other. The speed of the belt is slightly in excess of the speed of the machine or discharge of prints therefrom. The length of the belt for any particular speed of travel thereof is predetermined by the time required for the prints to dry. Thus, as the speed of the printing machine is increased, the length of the belt must likewise be increased so as to provide the time element required for drying the prints. The length of the belt is for practical reasons limited, which as a consequence limits the speed at which the printing machine may be operated.

An object of the invention is to provide for handling prints of the above character in a manner so as to materially reduce the distance of travel of the prints to provide for the drying thereof.

Another object of the invention is to provide for handling prints of the above character in a manner so as to materially increase the number of prints which may be handled for a certain length of conveyor.

A more specific object is to provide an apparatus for handling work of the above character in which the work will be held vertically suspended in the moving thereof from one end of the apparatus to the other.

Another object is to provide an apparatus for handling work of the above character in which the work will be received in one plane and automatically revolved to be held vertically suspended in moving the same to the opposite end of the apparatus.

Another object is to provide a conveyor apparatus for handling work of the above character in which the movements of the conveyor elements will be co-ordinated with the printing cycle of the printing machine through some reciprocal motion of the said machine.

Another object is to provide a conveyor apparatus for handling work of the above character in which individual link elements of the conveyor will carry self-closing work gripping elements for receiving and holding the work for traveling the same through the apparatus.

Another object is to provide a conveyor apparatus for handling wet prints suspended to be passed over some drying unit.

Another object is to provide a conveyor apparatus for handling wet prints in which the travel of the link elements thereof will be step by step co-ordinated to the speed of the printing machine at any moment of operation thereof.

Another object is to provide a conveyor in which individual link elements thereof will be fed from a hopper to a location to receive and transport the work to the opposite end of the conveyor.

Another object is to provide a conveyor in which individual link elements will be traversed across the machine by a pushing action from adjacent link elements.

With these and other objects in view, the invention consists of certain novel features of construction as will be more fully described and particularly pointed out in the appended claims.

In the accompanying drawings:

Figure 1 is a side elevational view of an apparatus for handling wet prints as delievered from a screen printing machine.

Figure 2 is a longitudinal section through a fragmental portion of the apparatus shown in Figure 1;

Figure 3 is a sectional view on an enlarged scale of a fragmental portion taken substantially along line 3—3 of Figure 2;

Figure 4 is a view similar to that shown in Figure 2 but showing the parts in different position;

Figure 5 is a sectional view of the lower portion of the link hopper shown in Figure 4 on an enlarged scale;

Figure 6 is a sectional view similar to that shown in Figure 5 but on a reduced scale showing a different relation between certain elements of the apparatus;

Figure 7 is an elevation of one of the links of the apparatus;

Figure 8 is a sectional view of a fragmental portion of the delivery end of the apparatus;

Figure 9 is a sectional view taken substantially along line 9—9 of Figure 8;

Figure 10 is a sectional view of the print disengaging element of the machine;

Figure 11 is a perspective view of a fragmental portion of one of the links;

Figure 12 is a longitudinal section of a modified construction;

Figure 13 is a side elevational view of a fragmental portion of the lower stretch of the link chain shown in Figure 12 illustrating the work gripping element in the print release position;

Figure 14 is a side elevational view of one of the work gripping elements of the arangement shown in Figure 12;

Figure 15 is a front elevational view of the work gripping element shown in Figure 13;

Figure 16 is a view of a modified work gripping arrangement; and

Figure 17 is a front elevational view of the same.

The apparatus shown in the drawing is particularly adapted for handling wet prints as discharged from the printing area of a screen printing machine by means of a conveyor-like apparatus having a plurality of link elements provided with self-closing work gripping members for receiving and holding a print while traversing the same to the opposite or delivery end of the apparatus. The prints are received in a horizontal plane from the printing machine and upon a sufficient travel of the link to clear the print of the printing machine, the link will operate to swing or revolve the print to a vertical plane and carry the same in the vertically suspended position across the apparatus. Thus, I am able to move a very large number of prints in a relatively small length of conveyor at a speed to permit drying of the prints at high speed of operation of the printing machine. With a view to drying the prints in a relatively short distance of travel, a heater element may be positioned beneath the path of the traveling prints so that the heat from the heater will radiate upwardly between the suspended prints as they are being moved past the heater, thus making possible yet further increase in speed of operation of the printing machine. The movement of the conveyor is co-ordinated to that of the printing machine by utilizing some reciprocating movement of the machine such as the screen carrier to provide the motion to move the link elements so that the conveyor unit will be in co-ordination with the machine at any instant of operation thereof.

Referring to the drawings, only so much of the screen printing machine 20 is illustrated as is necessary to understand the invention. This machine (Figure 1) has a carriage 21 which is reciprocated along spaced guides 22. The printing screen 23 of the usual construction provided with its squeegee 24 is supported on the carriage 21 and is reciprocated therewith lengthwise of the machine. The machine has the usual table 25 on which the sheets to be printed are fed to the machine. The detailed operation of the machine is not concerned with the present invention, and it is pointed out that with the carriage 21 in the position shown in Figure 1 and moving towards the right, the squeegee 24 is in printing position and moving along the screen towards the left or front of the machine, as seen in Figure 1; the printing takes place and is completed prior to the end of the movement of the carriage 21 towards the right. On the return stroke of the carriage the screen and its associated elements are returned to initial position for another cycle of printing.

The printed sheet which now may be referred to as a print P is discharged flat and face up on to a horizontal extending endless belt conveyor 26 (see Figure 4) which is being moved at a higher speed than the speed of delivery of the print from the said printing area so that the print upon being free of the printing mechanism will be propelled towards the right from the machine.

Adjacent to the discharge end of the printing machine 20 is an apparatus designated generally 30 (Figure 1) for handling the wet prints P so as to maintain the same separated from each other for a period of time necessary to permit drying for subsequent handling. In the present embodiment of the invention as shown in Figures 1 to 11, inclusive, the apparatus 30 is a conveyor-like structure having a plurality of separate links 31 (see Figures 7, 9, and 11) which are individually fed from a hopper 32 (Figures 2 and 4) to be traversed side by side along a horizontal guide provided on a frame 33 (Figure 1) and returned by means of an upwardly inclined endless belt conveyor 34 (see Figures 2, 8, and 9) which discharges the links on to a track 35 which is inclined downwardly towards said hopper 32 for the said links to be urged by gravity and pushed along the track 35 and fed on demand into the hopper 32.

Each link 31 (see Figures 7, 11) is generally elongated in shape providing a body 36 with the ends forming spacer blocks 37. A pin 38 projects outwardly at each end of the link body at a location so that a line between the pins will be to one side of the center of gravity of the link body for a purpose to be hereinafter described. The print is held on the link by means of a plurality of similar self-closing work gripping elements 39, each of which comprises a clamping plate 40 which is hingedly mounted as at 41 on an L-shape bracket 42 which is secured to the side 43 of the link body as by means of a screw 44 (Figure 9) to position the hinge joint 41 over and above the side 45 of the link. The plate 40 is slightly wider than the spacing between the side 45 and the joint 41 and is resiliently biased towards the side 45 as by means of a piece of flexible tubing 46 (see Figure 11) positioned and held between the clamp plate 40 and the adjacent overhang of the bracket. The hopper 32 is vertically disposed and the links 31 are fed therein with the side 45 facing upwardly and the side 43 facing the right or discharge end of the apparatus as seen in Figure 1. The pins 38 extend in guide slots 47 which guide the links through the hopper and the pins of the lowermost link engage against a stop or rest 48 at the sides of the hopper.

In order to co-ordinate the operation of the apparatus with that of the printing machine, a bracket 50 (see Figures 2 and 4) is attached to the carriage 21 to reciprocate therewith and depends below the sides 51 to support spaced horizontal members or arms 52 between which is mounted a platform 53 to extend beneath the lower stretch of the conveyor belt 26. The said platform 53 is provided on its upper surface with spaced strips 54 of sponge rubber which extend lengthwise of the platform. Each arm 52 is similar and the upper side or edge 55 has an abutment which is upwardly inclined as at 56 and the end of which forms a shoulder 57. The arms extend from the bracket 50 inwardly of the rests 48 and beneath the lowermost link 31 at a location to receive a link 31 and place it in position to receive a print. With a view of maintaining the arms 52 in alignment, a gib-like element 58 shown in dotted lines is attached to each arm to slidably engage the upper side 59 of frame member 60 of the apparatus. There is also mounted on the carriage 21 (Figure 2) at the rear portions a link-engaging member 61 having a foot portion extending horizontally rearwardly of the carriage and in position to engage and dislodge the lowermost link 31 off the rests 48, which causes it to drop therefrom on to the upper edge 55 in position to receive a print as fed from the printing machine. In order to check the fall of the links, a resilient yieldable element 62 is mounted on each side of the hopper frame to extend into engagement with the lower links 31 and a threaded adjusting member 63 extends into engagement with the element 62 to adjustably bias the same against the said lower link. Thus, as the link is pushed off the rests 48, the members 62 will yield but will check the fall of the said links onto the arms 52.

In the operation of the machine, as previously indicated, the carriage 21 will be reciprocated from right to left and from left to right to complete the printing cycle, the printing taking place as the carriage is being moved towards the right. As the carriage is being moved towards the right (see Figure 2), the link-engaging member 61 will engage and push the lower link 31' from the rests 48 against the bias of element 62 and the said link 31' will fall or drop on the edge 55 of the arms 52. In the position occupied in the hopper 32, the side 45 of the link will be facing upwardly and in the plane of the work surface of the conveyor 26 and with the clamp plate 40 inclined away from the said conveyor 26. Upon further movement of the carriage 21 in the same direction, the print p' now completed will be discharged from the printing area face up on to the conveyor 26. As previously described, the conveyor 26 is moving faster than the discharge of the print so that upon the same being free, it will be fed towards the link 31' with sufficient force or momentum for its leading edge to strike against the clamp plate 40 (see Figure 11) and swing the same about the pivot 41 to push past the plate into engagement with the vertical portions of the clamp brackets 42. The clamp plate 40 under action of gravity which is supplemented by the resilient tubing 42 will swing back into engagement with the marginal edge of the print, and any pull on the print will tend to move the plate 40 into firmer gripping relation with the print. This completes the printing half of the printing cycle. In order to assure the print P' being properly guided to the link 31', a lower guide plate 65 (Figure 5) and upper guide fingers 66 are provided.

On the other half cycle of the printing, the carriage is moved in the other direction or towards the front of the machine and the loaded link 31' being blocked against movement toward the front by the pins 38 thereof engaging against the rear of the rests 48 will ride along the edges 55 of the arms 52. It is here noted that the print P' is still resting on the conveyor 26, the movement of which tends to move the said print into the jaws of the clamps. At near the end portion of movement of the carriage 21 toward the front, the loaded link 31' will ride up the incline 56 (see Figure 6) and drop on the other side thereof behind the shoulder 57 (see Figures 4 and 5). On the next printing cycle of the machine, the rearward traverse of the arms 52 or movement thereof towards the right will carry the link 31' along therewith and the print P' clamped thereto which will now be referred to as P" (Figure 2) will move off the conveyor 26 to drop on the sponge rubber covered platform 53 (see Figure 2). Upon further movement of the arms 52 in the same direction, the pins 38 of the link 31' now indicated 31" (Figure 2) will engage and be pushed up an incline 67 on to a guide or track 68 and past a latch 69 pivoted as at 70 on a vertical upright of the apparatus frame (see also Figure 3). The latch 69 is free to swing in the direction of movement of the links on the tracks 68 but is blocked against movement in the other direction by stops 71. There is a latch 69 and associated structure at both sides of the apparatus. Prior to moving the link 31" on the tracks 68, the end 72 of the arms 52 will engage and move a prior advanced link 31 off the portion of the track to be occupied by a subsequent advanced link. Thus, the links 31 are advanced along the tracks 68 by a push from a subsequent advanced link. Upon moving the link 31" up the incline 67, the print will be pulled along the sponge rubber platform which will provide a drag thereon to tend to pull the print from the clamps which will in turn cause a pull on the plate 40 to swing the same further into clamping relation with the said print.

As the arms 52 are moved rearwardly as above described to advance a loaded link 31, the previously described action of feeding a link 31 from the hopper 32 in position to receive a print is taking place so that after initial start of the machine, a link 31 is loaded and a prior loaded link is advanced towards the rear or delivery end of the print handling apparatus at each printing cycle. On the reverse movement of the arms 52 or movement towards the front of the apparatus, the link 31" will become free of the arms as well as the print becoming free of the platform 53 whereupon the link 31" will swing about the pins 38 as a pivot to hold the print suspended (see Figures 2 and 4). As the link turns, the print, which must displace air in its movement, acts as a buffer to slow the turning action whereby the print comes to a stop without over-swinging in contact with a prior suspended print. With a view of preventing overturning of the links, a resilient bumper 73 is provided for the links to engage as turned about the said pins 38. As will be best seen in Figure 2, the prints are maintained spaced from each other by the spacer blocks 37 of one link engaging against the adjacent link, thus providing for air circulation between each print.

The loaded links are advanced along the tracks 68 and the prints carried thereby pass over a heating unit designated generally 74 (see Figure 1) from which heat will rise upwardly between the prints. As each link reaches the delivery end of the apparatus, an operator lifts a link from the track 68 (see Figure 8) and releases the print by engaging the plates 40 against a straight edge 75 (see Figure 10) to move the said plates to open position whereupon the print will drop into a collecting bin 76 (see Figure 1). The now empty link is placed in proper position on a track 77 (see Figures 1 and 8) to slide into engagement with the belt conveyor 34 which is formed by means of a plurality of endless tapes 78 (see Figure 9) passing over pulleys 79, 80 (Figure 1) secured to shafts 81, 82, which are suitably journaled on the upwardly inclined supports 83 of the apparatus frame. The links are entirely supported on the said tapes, the upper stretches of which move over a platform 84 (Figure 8) extending between the said supports 83. The shaft 79 is the drive shaft of the conveyor 34 and may be suitably driven from any suitable source such as an electric motor (not shown). The links as they pass over the upper end of the conveyor on to the track 35 may accumulate thereon with the link nearest to the hopper bearing against the upper link in the said hopper and may in some instances block the said upper link from feeding through the hopper. With a view of preventing such occurrence there is mounted on each side of the hopper 32 an arm 85 which is pivoted as at 86 for swinging movement and which reaches to the upper end of the hopper and carries a bumper 87 in line to engage the pin 38 of the link 31 nearest to the upper link in the hopper. The carriage 21 has a pin 88 (see Figures 2, 4) or the like attached thereto on each side thereof in line with said arms 85. As the carriage 21 moves to the right, the pins 88 will engage the arms 85 and swing the same in a direction for the bumpers 87 to engage the pins 38 and push the said nearest link from the hopper whereupon the said upper link in the hopper will be free to fall or move downwardly to replace a link which has been removed from the hopper. A pull spring 89 (Figure 2) returns the arms 85 to initial position against a stop 90 formed by a cross tie of the hopper.

In Figure 12 I have shown a modified arrangement in which the usual roller chain 91 is employed as a means for conveying the work from one end of the apparatus to the other. The chain carries spaced pairs of clamp jaws 93, 94 between which is received a print P to be conveyed thereby past the heater unit 74. The jaw 93 is stationary and the jaw 94, as best seen in Figure 15, is made of a plurality of separate elements 95 pivotally mounted as at 96 between a pair of lugs 97 for free movement to and from the jaw 93. The jaw 94 could also consist of but a single element but preferably is made as shown. The chain 91 passes over a usual spaced sprocket wheel 92 which may be driven in any appropriate manner as by means of a Geneva motion mechanism (not shown) to index a clamp-carrying link in register to receive a print from the machine conveyor 26' from which the print P is propelled to engage and move past the jaw 94. The other end of the chain passes over a similar sprocket (not shown). After the print has been moved into engagement with the jaws 93, 94, the conveyor 26' is caused to be swung downwardly to the dotted line position shown in Figure 12. The distance of movement of a jaw about the sprocket 92 will depend upon the material of print P. When the print is non-rigid, as for example sheet paper, the sprocket 92 may be turned 45 degrees for each printing cycle, which will be sufficient to clear the print P from the conveyor. When the print is a cardboard stock and the like, the sprocket 92 may be turned 90 degrees at each printing cycle in order to clear the conveyor 26'. Upon being free of the conveyor 26', the free end of the print will fall and upon a further index of the chain at the next printing cycle, the prints P will be carried suspended from the lower stretch of the chain to pass over the heating unit 74 in a manner previously described. Upon the clamp-carrying link reaching the delivery end of the chain, the jaw elements 95 in moving about the said sprocket (not shown) will swing to open position through gravity action to free the print.

With a view of releasing a print P from the jaws 93, 94 other than by gravity action, a jaw-releasing member 98 is provided. This may be conveniently formed of a single length of wire material bent in general U-shape providing arms 99, 100 joined by a bight 101 (see Figure 15). The arm 99 is further bent at right angles and provides a bearing 102 which is journalled in suitable bearing openings 103 in the lugs 97. The bight 101 is adapted to rest across the outer ends of element 95 at a location forward of the pivot 96. At some chosen location along the lower stretch of the chain 91 (see Figure 13) there is positioned in the path of the arm 100 a cam 104 against which the said arm 100 will engage to swing the latter and the bight 101 in a counterclockwise direction as seen in Figures 13 and 14 to swing the elements 95 or jaw 94 inwardly from the jaw 93 and thus release the print P, which may drop in a suitable receptacle as 76 shown in Figure 1.

In Figures 16 and 17 there is shown a further modification of clamping jaws in which the movable jaw is a sphere 105 held between spaced arms 106, 107 converging outwardly towards each other. The arm 106 provides one jaw of the clamp and the arm 107 is provided with side flanges 108 to retain the sphere or ball 105 in place. This modified clamp may be attached to the chain links in a manner similar to that shown in Figure 12. A print propelled from the conveyor 26' will push past the ball, which through gravity due to the inclination of the arms will roll towards the constricted end of the clamp to engage and hold a print suspended during the traverse of the lower stretch of the chain. As the clamp-carrying link is turned from the low stretch of the chain at the delivery end of the chain to be positioned in the upper stretch thereof, the ball 105 will roll inwardly to release the print.

I have described the invention in connection with a screen printing machine. However, the invention is particularly adapted for handling work of sheet form in which an operation thereon requires a predetermined exposure to the atmosphere.

I claim:

1. An apparatus for handling sheet work which requires drying after a prior operation thereon, comprising spaced tracks, a hopper, a reciprocating carriage, a plurality of separate link elements on said tracks and in said hopper, engaging jaws on each element for receiving and holding the work, means on the carriage for extracting an element from the hopper and positioning it on the carriage during and near the end of its forward movement, means for delivering a work piece into the jaws of the extracted element during further forward movement of the carriage, and means for preventing rearward movement of the extracted element along with the carriage during the rearward movement of the latter, said carriage upon its next forward movement engaging the element with the work piece for carrying said element on to said tracks and at the same time engaging the element ahead of said element for forcing it forwardly along said tracks to contact an element on said tracks ahead of it and force said contacted element and other elements ahead of the contacted element forwardly through the apparatus.

2. An apparatus as in claim 1 wherein each element has cylindrical pins in its ends slidable along said tracks, said pins permitting rotation of the elements through 90° from the position of receiving said work piece to suspend the work piece during movement of the element along the tracks.

3. An apparatus as in claim 1 wherein said tracks are spaced from said hopper and said carriage transfers the elements across said space.

4. An apparatus as in claim 1 wherein there are additional tracks above the hopper along which said elements slide to feed said elements into said hopper.

5. An apparatus as in claim 1 wherein there are additional tracks above the hopper along which said elements slide to feed said elements into said hopper, said hopper holding said elements in vertically superimposed relation whereby the elements move downwardly in said hopper by gravity.

References Cited in the file of this patent

UNITED STATES PATENTS

| | | |
|---|---|---|
| 860,621 | Taylor | July 16, 1907 |
| 1,540,687 | Feistel | June 2, 1925 |
| 2,355,697 | Belluche | Aug. 15, 1944 |